United States Patent [19]
Zaretsky

[11] Patent Number: 5,285,366
[45] Date of Patent: Feb. 8, 1994

[54] CURRENT LIMIT CIRCUIT IN CURRENT MODE POWER SUPPLIES

[75] Inventor: Boris Zaretsky, Norcross, Ga.

[73] Assignee: Northern Telecom Limited, Quebec, Canada

[21] Appl. No.: 950,240

[22] Filed: Sep. 24, 1992

[51] Int. Cl.⁵ .................... H02H 7/122; H02H 3/335
[52] U.S. Cl. .......................................... 363/56; 363/21
[58] Field of Search ............. 363/21, 56; H02M 3/335

[56] References Cited

U.S. PATENT DOCUMENTS 4,037,271 7/1977 Keller et al. ............................ 363/21
4,761,702 8/1988 Pinard .................................... 363/56

FOREIGN PATENT DOCUMENTS 247687 12/1987 European Pat. Off. .... H02M 3/335
421245 4/1991 European Pat. Off. .... H02M 3/335
63-87173 4/1988 Japan .......................... H02M 3/335
1405100 6/1988 U.S.S.R. ....................... H02M 3/335

Primary Examiner—William H. Beha, Jr.
Attorney, Agent, or Firm—Foley & Lardner

[57] ABSTRACT

A current mode power supply having a switching topology with a pulse width modulated duty cycle with a current sensing resistor is short circuit protected by a current limit circuit. The current limit circuit has inputs coupled to the current sensing resistor and the dc source input. The current limit circuit provide an output signal connected to the pulse width modulator, for shortening the duty cycle in dependence upon the sum of voltage signals from the current sensing resistor and the dc source input.

8 Claims, 1 Drawing Sheet

CURRENT LIMIT CIRCUIT IN CURRENT MODE POWER SUPPLIES

This invention relates to current mode power supplies and is particularly concerned with current limiting during short circuit occurrences.

BACKGROUND OF THE INVENTION

The power stage of conventional current mode power supply has a lot of advantages inherent in its topology. One is that if a short circuit occurs, the voltage on the current sense resistor increases, exceeding the current limit threshold set by the PWM chip, thus causing removal of the gate drive from the MOSFET transistor. During the time required to remove the gate drive the MOSFET must dissipate power. This is normally facilitated by a heatsink. Cost and space consideration make it desirable to eliminate the need for a heatsink for Power MOSFET transistors or, to reduce the heatsink size to the minimum required for a normal power supply operation.

SUMMARY OF THE INVENTION

An object of the present invention is to provide an improved current limit circuit for a current mode power supply, or any power supply where the peak current is tested on a pulse-by-pulse basis.

In accordance with the present invention there is provided a current mode power supply, comprising: a switching topology including a transformer having primary and secondary windings, a controllable switch connected between one side of the primary winding and a first reference potential input via current sensing means, a dc source input connected to the other side of the primary winding and control means for operating the controllable switches to control the duty cycle of the power supply; and current limit means, having inputs coupled to the current sensing means and the dc source input and an output connected to the control means, for shortening the duty cycle in dependence upon the sum of voltage signals from the current sensing means and the dc source input.

An advantage of the present invention is that the size of a heatsink can either be reduced to a size just large enough to meet dissipation requirements for normal operation, thus avoiding over design for the short circuit occurrence or be eliminated altogether. For a low power application, when surface mounted components are used, it is particularly important to minimize component space in order to achieve higher power density per unit of volume.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
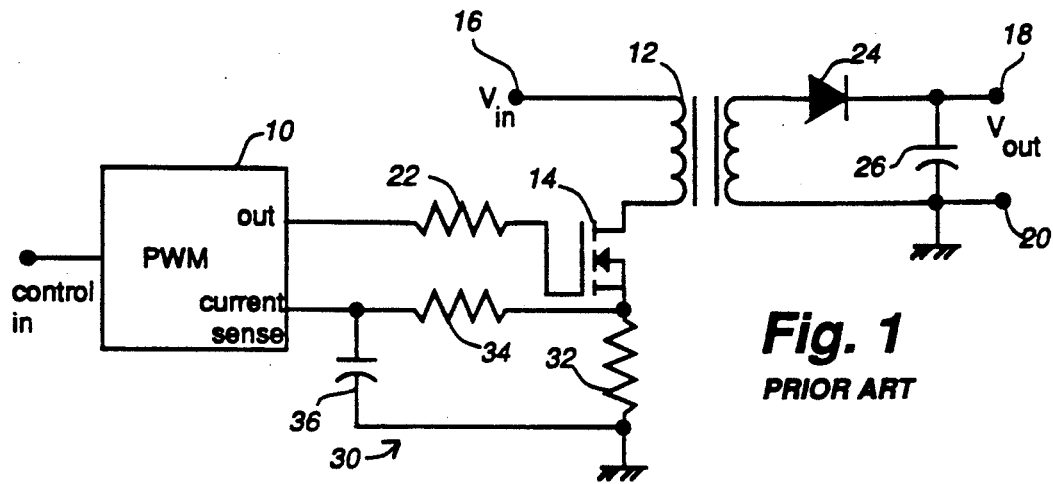
FIG. 1 schematically illustrates a known current mode power supply with a current sensing resistor.

Referring to FIG. 1, there is illustrated a known current mode power supply. The current mode power supply includes a pulse width modulator (PWM) 10, a transformer 12, a switching transistor 14, a voltage input 16, a voltage output 18, and a grounded output 20. On the output side of the power supply, the transformer 12 has one end of its secondary connected to the voltage output 18 via a diode 24 and the other end connected to the grounded output 20. A capacitor 26 couples the voltage output 18 to ground.

The input side of the power supply includes a current sensing circuit 30 having a current sensing resistor 32 and an integrator including a resistor 34 and a capacitor 36.

In operation, in the event of a short circuit, the voltage drop across the current sense resistor 32 increases, thereby exceeding the current limit threshold set by the PWM 10. This theoretically results in the immediate removal of the drive voltage applied to the gate of switching transistor 14. However, this is an oversimplification of the manner in which the circuit actually operates.

The transistor 14 initially operates in accordance with the design intent. When a short circuit occurs, the transistor 14 gate receives a drive voltage. The transistor 14 turns on and the drain voltage "travels" to saturation delayed by capacitive nature of MOSFET. A high drain current (as much as 3 to 4 times of the peak current) is developed due to the short circuit at the power supply output 18. The PWM 10 measures this current via its current sense input and removes the drive from the gate of transistor 14 while its drain voltage change has stopped within 20 to 30% of its saturation. The power dissipated on the transistor can be calculated as a product of the drain-to-source voltage ($V_{ds}$) "left" on the transistor and its RMS current ($I_{rms}$). In this case:

$$V_{ds} = V_{in} \times 0.3 = 52V \times 0.3 = 15.6V \tag{EQ 1}$$

$$I_d = 4 \times I_{pk} = 4 \times 0.4A = 1.6A \tag{EQ 2}$$

The RMS current, $I_{rms}$ (a clock is set to 250 kHz; the tested short circuit current pulse length, t is 80 ns):

$$I_{rms} = I_d \sqrt{\frac{t/T}{3}} = 1.6 \sqrt{\frac{80 \times 10^{-9}/4 \times 10^{-6}}{3}} = 0.13 A \tag{EQ 3}$$

Where:

$I_d = 1.6$ A—transistor drain current during short circuit found in EQ. 2.

t=80 ns—the drain current pulse length during short circuit.

T=4 μs—clock period of PWM oscillator.

$V_{ds}$=15.6 V—drain-to source voltage during short circuit found in EQ. 1.

$V_{in}$=52 V—the power source voltage.

And the power dissipated on the transistor ($P_{tr}$) is:

$$P_{tr} = V_{ds} I_{rms} = 15.6V \cdot 0.13A = 2.03W \tag{EQ 4}$$

Power dissipation is typically removed by a heatsink.

Most off line power supplies or DC to DC converters operate as primary power devices. Therefore, in the case of a short circuit condition at the output, the monitoring stage of the circuit must be continuously powered from an outside source. If the power supply is used as an intermediate power converter fed from PUPS or other internal to the equipment power source, then the solution to the problem can be simplified by using single shot multivibrators instead of slow cascaded comparators as described below. The latter one is selected for this description because the level of complexity is higher.

Because the drain-to-source voltage ($V_{ds}$), found in EQ. 1, can not be controlled, the reduction of $I_{rms}$, found in EQ. 3, may be the only solution to the problem of reducing the power to be dissipated. The reduction of $I_{rms}$ can be achieved by a drastic reduction of the duty cycle.

Figure 2:
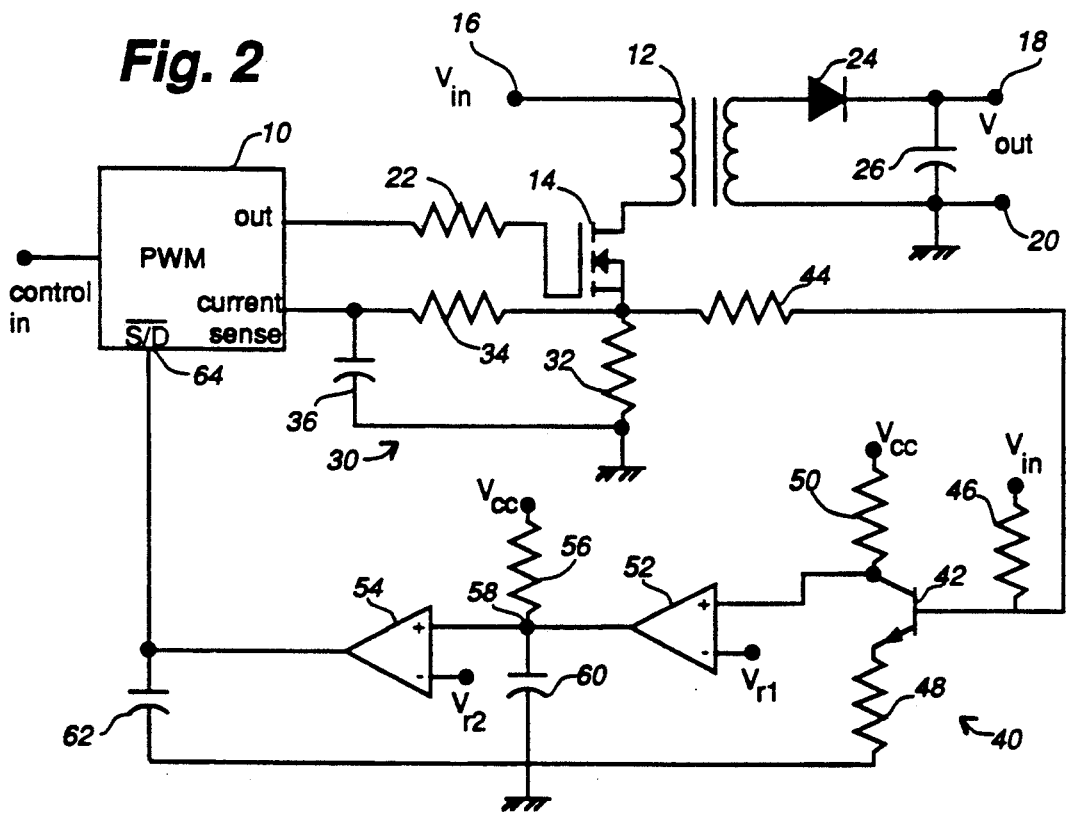
FIG. 2 schematically illustrates a current mode power supply with a current limit circuit in accordance with an embodiment of the present invention.

Referring to FIG. 2, there is schematically illustrated a current mode power supply having a current limit circuit in accordance with an embodiment of the present invention. The current limit circuit 40 includes a bipolar transistor 42 whose base is coupled to the current sensing resistor 32 via a resistor 44. A resistor 46 couples the base of the bipolar transistor 42 to the voltage input 16. A resistor 48 couples the emitter of transistor 42 to ground. The collector of transistor 42 is coupled to the $V_{cc}$ power supply via a resistor 50. The current limit circuit 40 also includes two series connected comparators 52 and 54. Conveniently, these comparators are provided in an IC package such as an LM2903 by Motorola. The noninverting input of the comparator 52 is connected to the collector of transistor 42. The inverting input is connected to a first reference voltage $V_{r1}$. The output of comparator 52 is connected to the noninverting input of comparator 54. The inverting input of comparator 54 is connected to a second reference voltage $V_{r2}$. A resistor 56 couples a node 58, to $V_{cc}$. A capacitor 60 couples the node 58 to ground. A capacitor 62 couples the output of comparator 54 to ground. The output of comparator 54 is connected to a shutdown input (S/D) 64 on the PWM 10.

In operation, the short circuit at the output 18 produces voltage spikes on the resistor 32. This voltage is monitored by transistor 42 via resistor 44. The base of transistor 42 serves as a summing point of voltages from the resistor 32 and voltage input 16. The resistor 48 provides transistor bias to adjust a sensitivity point of the monitor. The resistor 46 connects the input voltage 18 to the base of transistor 42 and serves to compensate voltage variations of the unregulated input supply. The transistor 42 is, for example, a 400 MHz transistor with only 4.5 pF input capacitance and timing characteristics compatible with voltage spikes on the resistor 32. The resistor 50 value is very high to reduce the requirement for current gain in the circuit. The voltage spike is transported from the base via Miller effect capacitance to the collector and stored in the output capacitor of the transistor. By that time the transistor is turned off. The RC time constant is large due to the low leakage current of transistor 42 and the high value of resistor 50 (typically 390 kohms). This time is enough to be read by the relatively slow comparator, for example, an LM2903.

The voltage on the noninverting input of comparator 52 is always higher than the first reference voltage $V_{r1}$ on the inverting input of comparator 52 during normal operation. The capacitor 60 is charged to $V_{cc}$ that is higher than second reference voltage $V_{r2}$. The charge keeps the output of comparator 54 high, thus, applying logic high to the PWM 10 shut down input 64. The comparators have open collector outputs. When a short circuit occurs, the voltage at the noninverting input of comparator 52 drops below $V_{r1}$ and the output transistor of comparator 52 (turned on) shunts the capacitor 60, thereby quickly discharging it. At the same time, the output of the comparator 54 drops to low applying logic low to the PWM 10 shut down input 64, thereby terminating its operation. Then, the comparator 52 returns to its original state ready for the next cycle. Its output goes high. However, the capacitor charge process is slowed down by the resistor 56. The time constant $R_{56} C_{60}$ and reference voltage $V_{r2}$ are selected to produce a 10 ms delay before the output of comparator 54 releases the shut down input 64 of PWM 10 from low to high. If the short circuit is not removed then the process repeats again.

This circuit changes neither the short circuit pulse length nor the "left over" voltage on the MOSFET. Only the time span between current sampling is changed. The new duty cycle is:

$$d = \frac{t}{T} = \frac{80 \times 10^{-9}}{10 \times 10^{-3}} = 8 \times 10^{-6} \qquad \text{(EQ 5)}$$

The new RMS current:

$$I_{rms} = I_{pk}\sqrt{\frac{d}{3}} = 1.6\sqrt{\frac{8 \times 10^{-6}}{3}} = 2.6 \ mA \qquad \text{(EQ 6)}$$

and the power dissipated on the surface mounted MOSFET transistor is:

$$P = V_{ds} \times I_{rms} = 15.6V \times 2.6mA = 40.5mW \qquad \text{(EQ 7)}$$

Any surface mounted component can withstand 40 mW dissipation without using a heatsink.

A variation of this circuit utilizing a single shot multivibrator instead of LM2903 comparator was implemented later and tested with the same success. This circuit could be used in any power supply topology as long as the current monitoring features and PWM shut down mechanism are implemented in the design.

What is claimed is:

1. A current mode power supply, comprising:
    a switching topology including a transformer having primary and secondary windings, a controllable switch connected between one side of the primary winding and a first reference potential input via current sensing means, a dc source input connected to the other side of the primary winding and a pulse width modulator having a current sensing input and a shut down input for operating the controllable switches to control the duty cycle of the power supply; and
    current limit means, having inputs coupled to the current sensing means and the dc source input and an output connected to the control means, for shortening the duty cycle in dependence upon the sum of voltage signals from the current sensing means and the dc source input.

2. A current mode power supply as claimed in claim 2 wherein the current limit means comprises series connected common emitter transistor, first and second comparators.

3. A current mode power supply as claimed in claim 2 wherein the base of the transistor is connected to the current sensing means and the dc source input via first and second resistors, respectively.

4. A current mode power supply as claimed in claim 3 wherein the first and second comparators have inverting input connected to second and third reference potentials, respectively.

5. A current mode power supply as claimed in claim 4 wherein the outputs of first and second comparators are connected to the first reference potential via first and second capacitors, respectively.

6. A current mode power supply as claimed in claim 5 wherein the first capacitor is connected to a supply potential via a resistor, the resistor and the first capacitor for providing a time constant to the second comparator which together with the third reference potential produce a suitable time delay.

7. A current mode power supply as claimed in claim 6 wherein the current sensing means comprises a resistor.

8. A current mode power supply as claimed in claim 7 wherein the controllable switch comprises a field effect transistor.

* * * * *